United States Patent
Saito et al.

(10) Patent No.: US 6,609,011 B1
(45) Date of Patent: Aug. 19, 2003

(54) RADIO COMMUNICATION SYSTEM, COMMUNICATION TERMINAL APPARATUS, BASE STATION APPARATUS, AND RADIO COMMUNICATION EQUALIZING METHOD

(75) Inventors: Yoshiko Saito, Yokosuka (JP); Mitsuru Uesugi, Yokosuka (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/856,872

(22) PCT Filed: Aug. 29, 2000

(86) PCT No.: PCT/JP00/05804
§ 371 (c)(1),
(2), (4) Date: May 29, 2001

(87) PCT Pub. No.: WO01/24403
PCT Pub. Date: Apr. 5, 2001

(30) Foreign Application Priority Data

Sep. 29, 1999 (JP) ............................................ 11-276131

(51) Int. Cl.[7] .............................. H04B 1/38; H04M 1/00

(52) U.S. Cl. ....................... 455/561; 455/69; 455/67.1; 375/285; 375/232; 375/296; 370/465; 370/252

(58) Field of Search ................................. 455/561, 229, 455/232, 137, 51.2, 67.1, 69; 375/347, 233, 341, 284, 348, 232, 342, 285, 231, 229, 296; 370/465, 252

(56) References Cited

U.S. PATENT DOCUMENTS

| | | | | |
|---|---|---|---|---|
| 5,513,215 A | * | 4/1996 | Marchetto | 375/233 |
| 5,692,011 A | * | 11/1997 | Nobakht | 375/233 |
| 5,862,192 A | * | 1/1999 | Huszar | 375/347 |
| 5,884,178 A | * | 3/1999 | Ericsson | 455/441 |
| 5,886,844 A | * | 3/1999 | Shimizu | 360/53 |
| 5,943,362 A | * | 8/1999 | Saito | 375/200 |
| 6,121,927 A | * | 9/2000 | Kalliojarvi | 342/453 |
| 6,124,997 A | * | 9/2000 | Hirasaka | 360/53 |
| 6,141,393 A | * | 10/2000 | Thomas | 375/347 |
| 6,212,371 B1 | * | 4/2001 | Sakuma | 375/229 |
| 6,243,412 B1 | * | 6/2001 | Fukawa | 375/219 |
| 6,252,914 B1 | * | 6/2001 | Yamamoto | 375/221 |
| 6,295,289 B1 | * | 9/2001 | Ionescu et al. | 370/342 |
| 6,327,302 B1 | * | 12/2001 | Shen | 333/18 |
| 6,330,294 B1 | * | 12/2001 | Ansbro et al. | 375/229 |

(List continued on next page.)

FOREIGN PATENT DOCUMENTS

| | | |
|---|---|---|
| CN | 1090446 A | 8/1994 |
| CN | 1168576 A | 12/1997 |
| EP | 0615347 A1 | 9/1994 |
| EP | 0804007 A3 | 10/1997 |
| JP | 60253331 | 12/1985 |

OTHER PUBLICATIONS

PCT International Search Report dated Nov. 28, 2000.
H. Harashima, et al., "Matched–Transmission Technique for Channels with Intersymbol Interference," *IEEE Transactions on Communications,* vol. 20, No. 4, Aug. 1972, pp. 774–780.
S. Tomisato, et al., "Signal Transmission Performance of Temporal and Spatial Pre–Coding for TDD Multimedia Mobile Radio Communication Systems," *Tehncial Report of IEICE DSP97–133,*(Jan. 1998), pp. 55–60.

*Primary Examiner*—Edward F. Urban
*Assistant Examiner*—Marceau Milord
(74) *Attorney, Agent, or Firm*—Stevens, Davis, Miller & Mosher, LLP

(57) ABSTRACT

The processing up to initial value setting in adaptive algorithm in a communication terminal apparatus is omitted by the use of a tap coefficient set by the adaptive algorithm in a base station as an initial value, and thereby the load of the calculation of equalization processing in the communication terminal apparatus is decreased, and the processing time of the equalization processing is shortened.

7 Claims, 3 Drawing Sheets

U.S. PATENT DOCUMENTS

| | | | |
|---|---|---|---|
| 6,349,219 B1 * | 2/2002 | Hochwald et al. | 342/368 |
| 6,366,569 B1 * | 4/2002 | Ritter | 370/337 |
| 6,373,888 B1 * | 4/2002 | Lindoff | 375/231 |
| 6,400,779 B1 * | 6/2002 | White | 375/224 |
| 6,404,759 B1 * | 6/2002 | Shoji | 370/342 |
| 6,408,023 B1 * | 6/2002 | Abdesselem et al. | 375/232 |
| 6,408,189 B1 * | 6/2002 | Nakamura et al. | 375/226 |
| 6,415,163 B1 * | 7/2002 | Keskitalo et al. | 455/562 |
| 6,421,543 B1 * | 7/2002 | Molnar | 455/272 |
| 2002/0099548 A1 * | 7/2002 | Manjunath et al. | 704/266 |

* cited by examiner

RADIO COMMUNICATION SYSTEM, COMMUNICATION TERMINAL APPARATUS, BASE STATION APPARATUS, AND RADIO COMMUNICATION EQUALIZING METHOD

TECHNICAL FIELD

The present invention relates to a radio communication system, communication terminal apparatus, base station apparatus and a radio equalizing communication method, for use in a digital radio communication system.

BACKGROUND ART

Because not only sounds but also data and pictures are transmitted in multimedia movement communication, high-speed and highly reliable transmission is needed. To realize such transmission, interference between codes generated by frequency selective fading should be restrained.

As a method for restraining the frequency selective fading, there is a pre-coding technique. The pre-coding technique is a technique in which a base station performs channel estimation by the use of a received signal on a reverse link to obtain a channel estimated value and the inverse function of the obtained channel estimated value is given to a signal on a forward link and then the signal having the inverse function is transmitted to a communication terminal and thereby the necessity of the correction of the distortion of the signal on the propagation path on the communication terminal side is ideally obviated.

The pre-coding technique can presume the state of propagation paths of the forward link on the basis of a signal on the reverse link in the case where the same frequency is used for the reverse link and the forward link like the time division duplex (TDD) system, and the pre-coding technique is realized by using a tap coefficient calculated from the signal on the reverse link as it is at the time of the transmission of the signal on the forward link. Moreover, because the hardware can be concentrated on the side of the transmission unit, the technique has an advantage that the hardware configuration on the side of the reception unit can be simplified.

Hereinafter, a conventional pre-coding technique will be described by reference to FIGS. 1 and 2. FIG. 1 is a block diagram showing the configuration of a conventional base station apparatus, and FIG. 2 is a block diagram showing the configuration of a conventional communication terminal apparatus.

The communication terminal apparatus shown in FIG. 2 performs the digital modulation of data to be transmitted in a modulation section 14 and performs the prescribed radio transmission processing of the digitally modulated data to be transmitted to transmit them to a base station apparatus through an antenna 11 as a transmission signal.

The base station apparatus shown in FIG. 1 receives the signal transmitted from the communication terminal apparatus with a plurality of antennas 1. At this time, the signal is received in the reception directivity formed by a directivity control section 2. The received signal is processed by a prescribed radio reception processing and becomes a baseband signal.

On the other hand, the channel estimation is performed by estimating the impulse response using adaptive algorithm 3. The set tap coefficient is transmitted to a replica generation section 4 and a pre-coder 9.

The replica generation section 4 obtains a candidate wave form (or a replica) by making the data pattern of the signal transmitted from the communication terminal apparatus pass through a filer on an estimated propagation path having the tap coefficient set by the adaptive algorithm 3. The replica is formed about all of the considerable data patterns.

The replica is compared with the data pattern of the signal transmitted from the communication terminal apparatus and the result of the comparison is transmitted to a judgment section 5. The judgment section 5 selects a replica being most approximate to the data pattern, and judges the data pattern corresponding to the replica to be the data pattern of the signal transmitted from the communication terminal apparatus to transmit the data pattern to an error detection section 6. The error detection section 6 performs the error detection processing of the judged data. Reception data are thereby obtained.

In the base station apparatus, data to be transmitted are transmitted to a frame formation section 8 after the data is digitally modulated in a modulation section 7. In the frame formation section 8, the data to be transmitted are configured into a frame configuration. The data configured to be the frame configuration are transmitted to a pre-coder 9.

In the pre-coder 9, the complex conjugate of the tap coefficient set by the adaptive algorithm 3 is multiplied by the data to be transmitted, and the inverse function of the impulse response on the propagation path is given to the data to be transmitted. Incidentally, at this time, divergence prevention processing such as the modulo-two operation (hereinafter referred to as MOD-2) of the transmitted data may be performed as the need arises.

The data to be transmitted to which the inverse function is given in such a way are transmitted from the antennas 1 in the directivity formed in the directivity control section 2 after a predetermined radio transmission processing of the data to be transmitted has been performed.

The signal transmitted from the base station apparatus is received by the antenna 11 of the communication terminal apparatus, and then the received signal is processed in conformity with the prescribed radio reception processing to be transmitted to a detection/de-pre-coder 12. The detection/de-pre-coder 12 demodulates the received data in conformity with the orthogonal detection or other demodulation methods. If the divergence prevention processing such as MOD-2 of the received data has been performed as mentioned above in this case, the de-pre-coder 12 presumes the received data.

The received data that has been demodulated in such a way is transmitted to an error detection section 13. The error detection section 13 performs the error detection processing to judged data.

However, in the aforesaid pre-coding technique, as shown in FIG. 3, a propagation environment is estimated on the basis of a signal received in the reception interval (RX) of the base station apparatus, and a tap coefficient obtained as the estimation result is used in the transmission interval (TX) of the base station apparatus. Consequently, because the inverse function of a channel is not updated in the reception interval of the communication terminal apparatus (corresponding to the transmission interval of the base station apparatus), there is a problem that the communication deteriorates in the reception interval of the communication terminal apparatus. The example shown in FIG. 3 is symmetrical communication, but, in case of asymmetrical communication, the pre-coding is performed by the use of a tap coefficient that has been estimated at earlier time, and the deterioration of communication becomes conspicuous. Because the rate of the asymmetrical communication becomes large in multimedia communication, this problem becomes serious.

DISCLOSURE OF INVENTION

An object of the present invention is to provide a radio communication system, communication terminal apparatus, base station apparatus and a radio communication equalizing method, capable of following the changes of a propagation environment and a capable of equalizing effectively the distortion that a signal receives in a propagation path.

The subject matter of the present invention is to decrease the load of the operation of the equalization processing in a communication terminal apparatus and to shorten the processing time of the equalization processing by using a tap coefficient set by adaptive algorithm in a base station apparatus as an initial value for omitting the processing up to initial value setting in the adaptive algorithm in the communication terminal apparatus.

BEST MODE FOR CARRYING OUT THE INVENTION

Hereinafter, an embodiment of the present invention will be described in detail by reference to the attached drawings.

Figure 1:
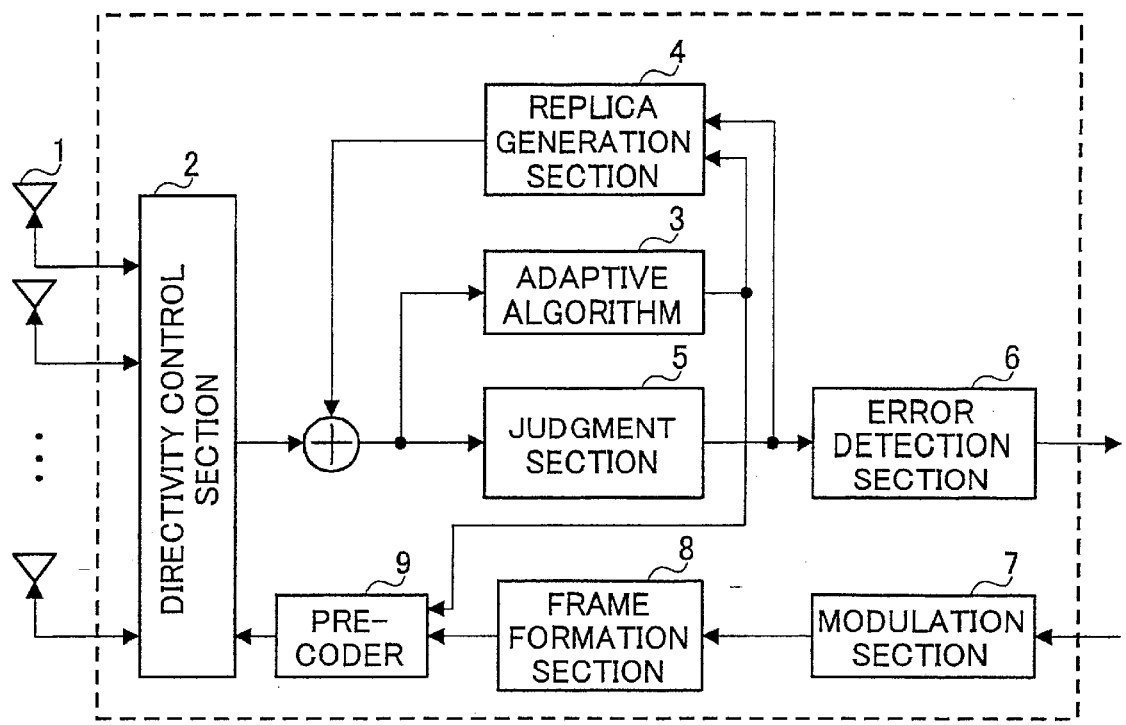
FIG. 1 is a block diagram showing the configuration of a conventional base station apparatus.
Figure 2:
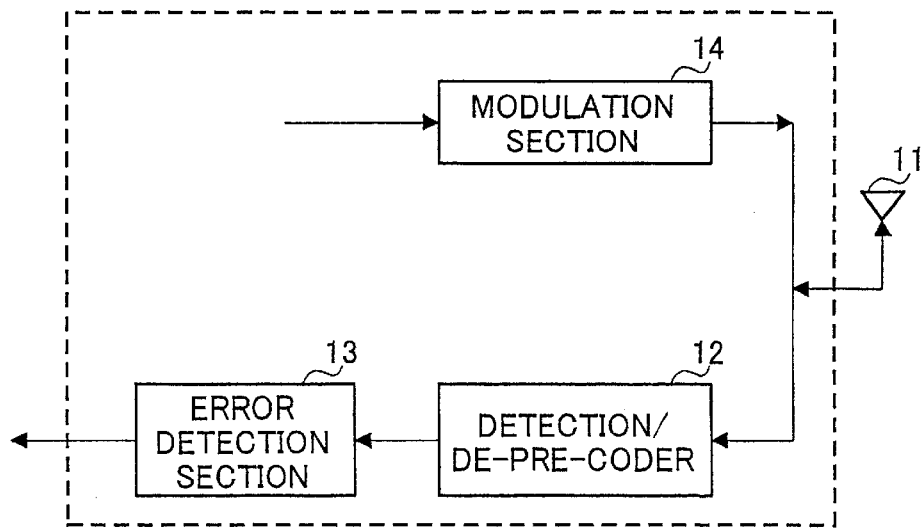
FIG. 2 is a block diagram showing the configuration of a conventional communication terminal apparatus.
Figure 3:
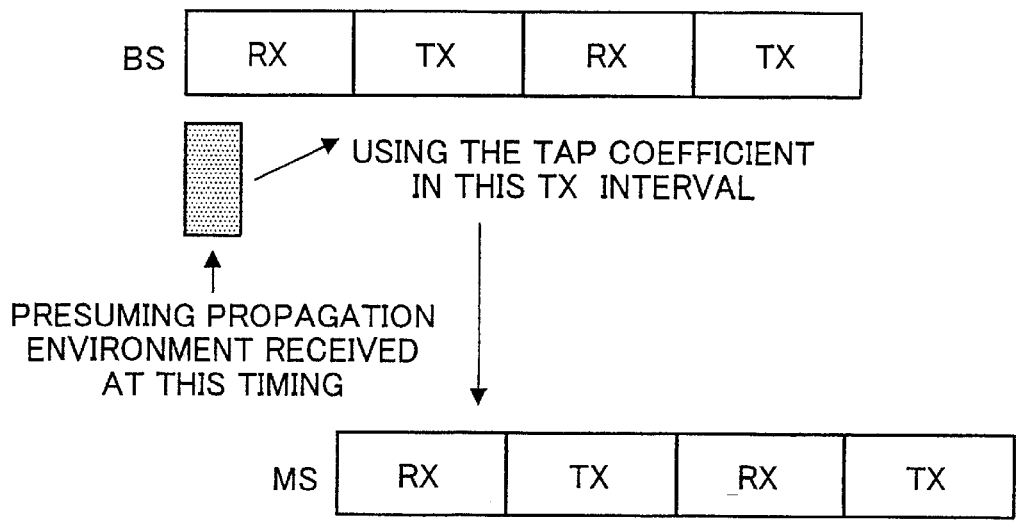
FIG. 3 is a timing chart for illustrating pre-coding.
Figure 4:
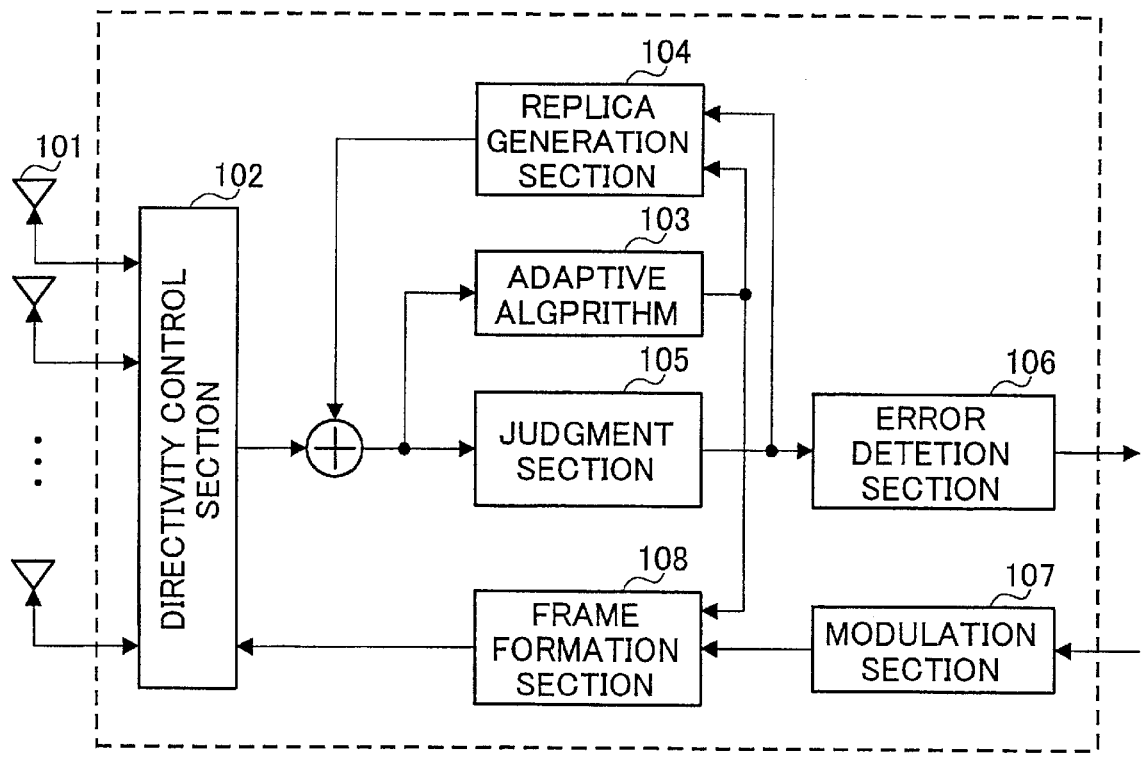
FIG. 4 is a block diagram showing the configuration of a base station apparatus according to an embodiment of the present invention.
Figure 5:
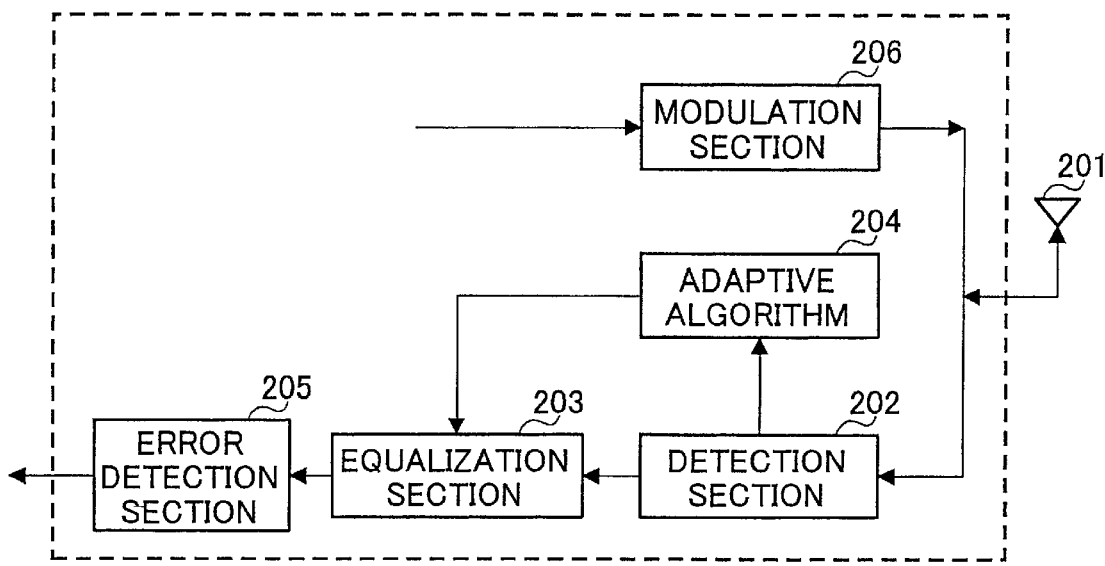
FIG. 5 is a block diagram showing the configuration of a communication terminal apparatus according to an embodiment of the present invention.

FIG. 4 is a block diagram showing the configuration of a base station apparatus according to an embodiment of the present invention, and FIG. 5 is a block diagram showing the configuration of a communication terminal apparatus according to an embodiment of the invention.

The base station apparatus shown in FIG. 4 comprises a plurality of antennas 101, a directivity control section 102 for controlling the directivity of reception and transmission, a replica generation section 104 for generating a replica by the use of adaptive algorithm 103 for obtaining a tap coefficient of a filter for an estimation propagation path, a judgment section 105 for performing the judgment of data to be transmitted by the comparison of a replica with the data to be transmitted, an error detection section 106 for performing the error detection processing of the data after the judgment, a modulation section 107 for performing the digital modulation of the data to be transmitted, and a frame formation section 108 for performing the frame configuration of the modulated data to be transmitted and the tap coefficient set by the adaptive algorithm.

The communication terminal apparatus shown in FIG. 5 comprises an antenna 201, a detection section 202 for demodulating a received signal in conformity with the orthogonal detection or other demodulation methods, an equalization section 203 for performing the equalization processing of the detected received data by means of adaptive algorithm 204, an error detection section 205 for performing the error detection of the equalized received data, and a modulation section 206 for performing the digital modulation of data to be transmitted.

The operation of the base station apparatus and the communication terminal apparatus that have the aforesaid configurations respectively will be described.

The communication terminal apparatus shown in FIG. 5 performs the digital modulation of the data to be transmitted in the modulation section 206 and performs the prescribed radio transmission processing of the digitally modulated data to be transmitted to transmit them to the base station apparatus through the antenna 201 as a transmission signal.

The base station apparatus shown in FIG. 4 receives the signal transmitted from the communication terminal apparatus with the plural antennas 101. At this time, the signal is received in the reception directivity formed by the directivity control section 102. The received signal is processed by a prescribed radio reception processing and becomes a baseband signal. The directivity control section 102 is a processing section for giving a weighting coefficient to each antenna to form the directivity thereof. The directivity control section 102 controls the reception directivity to be used at the time of reception and the transmission directivity to be used at the time of transmission.

On the other hand, the channel estimation is performed by estimating the impulse response using adaptive algorithm 103. That is, the tap coefficient is set by means of the zero forcing (ZF) algorithm, the least mean square (LMS) algorithm, the recursive least square (RLS) algorithm, or other algorithm on the basis of a received signal. The tap coefficient is successively updated in conformity with these pieces of algorithm. The set of these estimated tap coefficients is transmitted to the replica generation section 104 and the frame formation section 108 as channel estimation information.

The replica generation section 104 obtains a candidate wave form (or a replica) by making the data pattern of the signal transmitted from the communication terminal apparatus pass through a filer on an estimated propagation path having the tap coefficient set by the adaptive algorithm 103. The replica is formed about all of the considerable data patterns.

The replica is compared with the data pattern of the signal transmitted from the communication terminal apparatus and the result of the comparison is transmitted to the judgment section 105. The judgment section 5 selects a replica being most approximate to the data pattern, and judges the data pattern corresponding to the replica to be the data pattern of the signal transmitted from the communication terminal apparatus to transmit the data pattern to the error detection section 106. The error detection section 106 performs the error detection processing of the judged data. Reception data are thereby obtained.

Incidentally, in the maximum likelihood sequence estimation, the optimum data pattern may efficiently be searched by means of the Viterbi algorithm.

In the base station apparatus, data to be transmitted are transmitted to the frame formation section 108 after the data is digitally modulated in the modulation section 107. In the frame formation section 108, the data to be transmitted and the tap coefficient set by the adaptive algorithm 103 are configured into frame configurations. The data to be transmitted and the tap coefficient that have been configured to be the frame configurations are transmitted from the antennas 101 in the directivity formed by the directivity control section 102 after the prescribed radio transmission processing has been performed.

The signal transmitted from the base station apparatus is received by the antenna 201 of the communication terminal apparatus, and then the received signal is processed in conformity with the prescribed radio reception processing to be transmitted to the detection section 202. The detection section 202 demodulates the received data in conformity with the orthogonal detection or other demodulation methods. In this case, because the received data includes an information symbol and the tap coefficient information set by the base station apparatus, the symbol is transmitted to the equalization section 203 and the tap coefficient information is used as the initial value of the adaptive algorithm 204.

In the adaptive algorithm 204, generally, an initial value (main tap being one, and the others being zero) is first set for setting a tap coefficient, and the processing of updating a tap gain is performed after that. However, in the present embodiment, the tap coefficients are calculated by the adaptive algorithm in the base station apparatus is used as the initial value. Consequently, the coefficient can be set only by performing the processing of updating the tap gain. That is, the processing of updating the tap gain is performed from a level equal to the level at which the tap coefficient update processing has been performed to raise the estimation accuracy thereof to a considerable extent by means of the tap coefficient. As a result, the calculation up to the initial value setting in the adaptive algorithm can be omitted, and the load of the calculation of the equalization processing in the communication terminal apparatus can be decreased. Moreover, because the processing time can be shortened up to the initial value setting in the adaptive algorithm, the processing time of the equalization processing in the communication terminal apparatus can be shortened.

Figure 6:
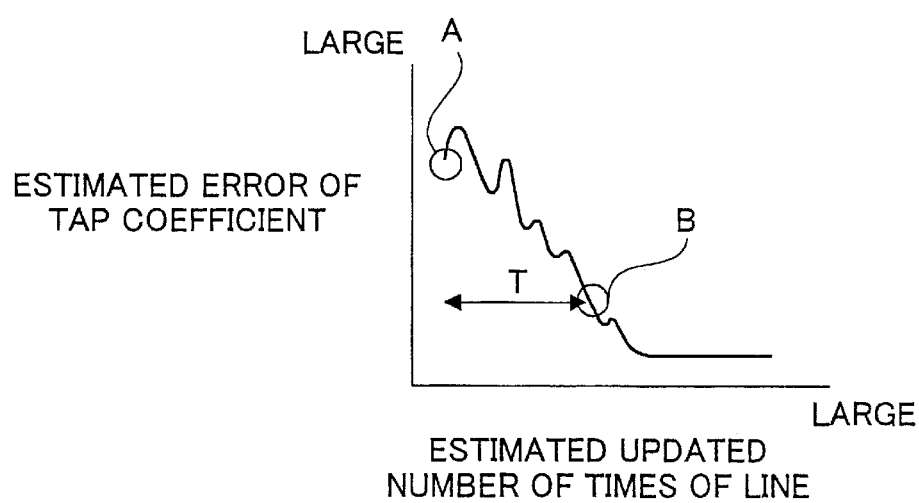
FIG. 6 is a graph for illustrating an advantage of the communication terminal apparatus according to the embodiment of the present invention.

To put it concretely, in FIG. 6, generally, when the communication terminal apparatus performs the equalization processing, the channel estimation processing is begun from the point "A" in FIG. 6. In the present embodiment, the channel estimation processing is begun from the point "B" in FIG. 6. In such a way, in the present embodiment, the channel estimation processing is performed after the tap coefficient update processing by which the estimation accuracy is raised up to a considerable level has been performed.

The tap coefficient set by the adaptive algorithm 204 is transmitted to the equalization section 203. The equalization section 203 forms an equalization filter by the use of the input tap coefficient, and the equalization section 203 performs the equalization processing of the information symbol (the reception data) after detection by means of the equalization filter.

The reception data processed in conformity with the equalization processing in this way is transmitted to the error detection section 205. In the error detection section 205, the error detection processing, e.g. cyclic redundancy check (CRC), of the judged data is performed. Reception data is thus obtained.

As described above, in the communication terminal apparatus according to the preset embodiment, because a tap coefficients are calculated by the adaptive algorithm in the base station apparatus is used as an initial value for omitting the processing up to the initial value setting in the adaptive algorithm in the communication terminal apparatus, the load of the calculation in the equalization processing in the communication terminal apparatus can be decreased, and the processing time of the equalization processing can be shortened.

Moreover, because the base station apparatus does not perform the pre-coding in the relation with the communication terminal apparatus, the load of the processing in the base station apparatus can be decreased.

In the case where the communication between the base station apparatus and the communication terminal apparatus in the radio communication method in the present embodiment is asymmetrical communication, the transmission and the reception of a short known signal is periodically performed between the base station apparatus and the communication terminal apparatus, and the tap coefficient set by the adaptive algorithm is periodically transmitted to the communication terminal apparatus from the base station apparatus as the channel estimation information. Consequently, even if the forward link is long owing to the asymmetrical communication, the communication terminal apparatus can perform the equalization processing of the reception data by the use of the tap coefficient transmitted periodically from the base station apparatus. Consequently, the equalization processing becomes possible to follow the propagation environment during the long forward links, and the deterioration of the performance of communication can be prevented.

The present invention is not limited to the aforesaid embodiment, but the invention can be implemented in various alterations. For example, although, in the aforesaid embodiment, the case where the communication system is the TDD system is described, the present invention can be applied to all of the systems in which the transmission and the reception are performed by the use of the same frequency like the code division duplex (CDM).

The communication terminal apparatus of the invention adopts the configuration comprising the reception section for receiving a reception signal including channel estimation information, and an equalization processing section for performing the equalization processing of the reception signal in conformity with the adaptive algorithm by the use of the channel estimation information.

According to the configuration, because the processing up to the initial value setting in the adaptive algorithm in the communication terminal apparatus by the use of the tap coefficient set by the adaptive algorithm in the base station as the initial value, the load of the calculation of the equalization processing in the communication terminal apparatus can be decreased, and the processing time of the equalization processing can be shortened.

Incidentally, here, the initial value setting in the communication terminal apparatus is to set the channel estimation information transmitted from the base station apparatus as the tap coefficient that the communication terminal apparatus estimated by improving the accuracy of the channel estimation information up to a certain extent estimation accuracy by means of the adaptive algorithm.

The base station apparatus of the present invention is a base station apparatus for performing the radio communication with the communication terminal apparatus having the aforesaid configuration, and the base station apparatus adopts the configuration comprising a channel estimation section for performing the channel estimation on the basis of the reception signal by the use of the adaptive algorithm, and a transmission section for transmitting a signal including the channel estimation information obtained by channel estimation means.

According to the configuration, the pre-coding is not performed in the relation with the communication terminal apparatus. Consequently, the load of the processing at the base station apparatus can be decreased.

The radio communication method of the invention obtains channel estimation information by performing channel estimation on the basis of a reception signal and transmits the signal including the channel estimation information to a communication terminal apparatus on the base station apparatus side, and performs the equalization processing of the signal transmitted from the base station apparatus in conformity with the adaptive algorithm by the use of the channel estimation information included in the signal transmitted from the base station apparatus on the communication terminal apparatus side.

According to the method, because the processing up to the initial value setting in the adaptive algorithm in the communication terminal apparatus by means of the tap coefficient set by the adaptive algorithm as the initial value in the base station apparatus, the load of the calculation of the equalization processing in the communication terminal apparatus can be decreased, and the processing time of the equalization processing can be shortened.

In the radio communication method of the invention, the communication between the base station apparatus and the communication terminal apparatus is asymmetrical communication, and the base station periodically transmits channel estimation information to the communication terminal apparatus.

According to the method, even if the forward link is long owing to the asymmetrical communication, the communication terminal apparatus can perform the equalization processing of reception data by the use of the tap coefficients transmitted periodically from the base station apparatus. Consequently, the equalization processing becomes possible to follow the propagation environment during the long forward link, and it is possible to prevent the deterioration of the performance of the communication.

As described above, according to the present invention, because the processing up to the initial value setting in the adaptive algorithm in the communication terminal apparatus is omitted by the use of the tap coefficient set by the adaptive algorithm in the base station apparatus as the initial value, the load of the calculation in the equalization processing in the communication terminal apparatus can be decreased, and the processing time of the equalization processing can be shortened.

This application is based on the Japanese Patent Application No. HEI 11-276131 filed on Sep. 29, 1999, entire content of which is expressly incorporated by reference herein.

INDUSTRIAL APPLICABILITY

The present invention can be applied to a base station apparatus and a communication terminal apparatus in a digital radio communication system.

What is claimed is:

1. A communication terminal apparatus for use in a radio communication system, wherein the radio communication system comprises a base station apparatus that transmits a downlink signal containing a tap coefficient obtained in association with an uplink signal, the communication terminal apparatus comprising:

a receiver that receives the downlink signal containing the tap coefficient obtained in the base station apparatus in association with the uplink signal; and an equalizer that performs equalizing on received data contained in the downlink signal received by the receiver, while updating tap coefficients, according to an adaptive algorithm for updating the tap coefficients using, as an initial value, the tap coefficient received in said downlink signal.

2. A base station apparatus for use in a radio communication system, wherein the radio communication system comprises a communication terminal apparatus that transmits an uplink signal, receives a downlink signal containing a tap coefficient, and performs equalizing on received data contained in the downlink signal while updating tap coefficients using, as an initial value, the tap coefficient transmitted in the downlink signal, the base station apparatus comprising:

a calculator that obtains said tap coefficient for use as an initial value of an adaptive algorithm employed in the communication terminal apparatus, in association with the uplink signal from the communication terminal apparatus; and a transmitter that transmits the downlink signal containing the tap coefficient obtained by the calculator to the communication terminal apparatus.

3. An equalizing method for use in a radio communication system comprising a base station apparatus and a communication terminal apparatus, the equalizing method comprising:

operating the base station apparatus to obtain a tap coefficient in association with an uplink signal transmitted from the communication terminal apparatus; and operating the communication terminal apparatus to receive a downlink signal containing said tap coefficient from the base station apparatus and to perform an equalizing operation on said received data while updating tap coefficients, according to an adaptive algorithm for updating the tap coefficients using, as an initial value, the tap coefficient received from said base station apparatus.

4. The equalizing method according to claim 3, wherein the method is used in radio communications performing communications using a same frequency on uplink and on downlink.

5. The equalizing method according to claim 3, wherein the method is used in radio communications performing communications using a same frequency on uplink and on downlink, and wherein the communications are asymmetrical on uplink and on downlink.

6. A communication terminal apparatus for use in a radio communication system, wherein the radio communication system comprises a base station apparatus that transmits a downlink signal containing a tap coefficient obtained in association with an uplink signal, the communication terminal apparatus comprising:

a receiver that receives the downlink signal containing the tap coefficient obtained in the base station apparatus in association with the uplink signal; and an equalizer that performs equalizing on received data contained in the downlink signal received by the receiver, while updating tap coefficients, using, as an initial value, the tap coefficient received in said downlink signal.

7. A base station apparatus for use in a radio communication system, wherein the radio communication system comprises a communication terminal apparatus that transmits an uplink signal, receives a downlink signal containing a tap coefficient, and performs equalizing on received data contained in the downlink signal while updating tap coefficients using, as an initial value, the tap coefficient transmitted in the downlink signal, the base station apparatus comprising:

a calculator that obtains said tap coefficient for use as an initial value of an equalizing operation employed in the communication terminal apparatus, in association with the uplink signal from the communication terminal apparatus; and a transmitter that transmits the downlink signal containing the tap coefficient obtained by the calculator to the communication terminal apparatus.

\* \* \* \* \*